(12) United States Patent
Katayama

(10) Patent No.: US 7,607,345 B2
(45) Date of Patent: Oct. 27, 2009

(54) MISFIRE DETECTION APPARATUS FOR INTERNAL COMBUSTION ENGINE

(75) Inventor: Akihiro Katayama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 176 days.

(21) Appl. No.: 11/912,155

(22) PCT Filed: Apr. 19, 2006

(86) PCT No.: PCT/JP2006/308686

§ 371 (c)(1),
(2), (4) Date: Oct. 22, 2007

(87) PCT Pub. No.: WO2006/112544

PCT Pub. Date: Oct. 26, 2006

(65) Prior Publication Data

US 2009/0063024 A1    Mar. 5, 2009

(30) Foreign Application Priority Data

Apr. 20, 2005    (JP) .............................. 2005-122962

(51) Int. Cl.
*G01M 15/11* (2006.01)
(52) U.S. Cl. .............. 73/114.02; 73/114.12; 73/114.04; 123/406.14; 123/406.27; 123/436
(58) Field of Classification Search . 73/114.02–114.12; 123/406.14, 406.27, 436
See application file for complete search history.

(56) References Cited

U.S. PATENT DOCUMENTS

| | | | | |
|---|---|---|---|---|
| 5,278,760 A | * | 1/1994 | Ribbens et al. | 701/111 |
| 5,531,108 A | * | 7/1996 | Feldkamp et al. | 73/114.05 |
| 5,823,166 A | * | 10/1998 | Entenmann et al. | 123/406.58 |
| 5,824,890 A | * | 10/1998 | La Palm et al. | 73/114.04 |
| 6,062,071 A | * | 5/2000 | Henn et al. | 73/114.04 |
| 6,324,483 B1 | * | 11/2001 | Sobel | 702/104 |
| 7,363,912 B2 | * | 4/2008 | Asano et al. | 123/436 |
| 2007/0056565 A1 | * | 3/2007 | Fuwa et al. | 123/481 |

FOREIGN PATENT DOCUMENTS

| | | |
|---|---|---|
| JP | 5-107155 | 4/1993 |
| JP | 5-203539 | 8/1993 |
| JP | 7-279734 | 10/1995 |
| JP | 3063007 | 5/2000 |
| JP | 2001-248689 | 9/2001 |
| JP | 2004-11449 | 1/2004 |
| JP | 2004-68982 | 3/2004 |
| JP | 2004-225552 | 8/2004 |
| JP | 2004-324524 | 11/2004 |

* cited by examiner

*Primary Examiner*—Erick Solis
(74) *Attorney, Agent, or Firm*—Oblon, Spivak, McClelland, Maier & Neustadt, L.L.P.

(57) ABSTRACT

In an internal combustion engine including a flywheel damper, an operation range in which misfire detection is affected by the flywheel damper is set in advance. Whether or not an operation state of the internal combustion engine is within an operation range affected by the flywheel damper is determined. When the operation state is within the operation range affected by the flywheel damper, for example a cylinder specifying process specifying a misfiring cylinder is stopped. By such processing, erroneous detection attributed to irregular rotation fluctuation behavior caused by the flywheel damper can be avoided, and misfire detection performance can be improved.

9 Claims, 6 Drawing Sheets

MISFIRE DETECTION APPARATUS FOR INTERNAL COMBUSTION ENGINE

TECHNICAL FIELD

The present invention relates to a misfire detection apparatus that detects a misfire based on fluctuations in rotation of an internal combustion engine, and more specifically, to a misfire detection apparatus for an internal combustion engine provided with a flywheel damper.

BACKGROUND ART

In an internal combustion engine incorporated in a vehicle, sometimes such a phenomenon occurs that air-fuel mixture in a combustion chamber is not ignited depending on conditions such as temperature or the state of a spark plug, i.e., what is called a "misfire". When a misfire occurs, not only the rotation speed of the engine is reduced, but also unburned air-fuel mixture is discharged to an exhaust manifold. This may degrade emission and may disadvantageously affect an emission purifying catalyst. Accordingly, in order for the misfire trouble in the internal combustion engine to be addressed at an early stage, occurrence of the misfire must be detected and reported to the driver.

As a misfire detection apparatus detecting a misfire in a multicylinder internal combustion engine, focusing on the fact that fluctuations in the rotation speed of the engine (hereinafter simply referred to as the rotation fluctuation) is great when a misfire has occurred, there has been proposed a misfire determination apparatus that determines occurrence of a misfire based on the rotation fluctuation, (for example, see Japanese Patent Laying-Open No. 05-203539 and Japanese Patent No. 3063007). The basic principle of misfire determination in such a misfire detection apparatus is as follows.

First, when a misfire occurs in one cylinder, the engine rotation speed in an explosion stroke (actually the misfire has occurred and therefore explosion has not occurred) in the cylinder is gradually reduced. As a result, the time period required for the crankshaft to rotate by a certain crank angle in the explosion stroke of the misfiring cylinder becomes longer than in an explosion stroke of the other cylinders. Accordingly, by measuring the time periods for the cylinders and comparing with each other, whether or not a misfire has occurred can be detected.

For example, as shown in FIG. 5, as to a six-cylinder internal combustion engine, when a certain cylinder (for example a third cylinder #3) is in an explosion stroke, an operation is performed to obtain a difference (T3−T2) between an elapsed time T3 required for the crankshaft to rotate by a certain crank angle in that explosion stroke, and an elapsed time T2 required for the crankshaft to rotate by a certain angle in an explosion stroke of a cylinder (for example a second cylinder #2) having been entered the explosion stroke a certain crank angle prior to the explosion stroke of third cylinder #3. When the operation value (the deviation of the elapsed time), that is, a rotation fluctuation amount, exceeds a prescribed threshold value, it is determined that a one-cylinder misfire (for example, a misfire of third cylinder #3) has occurred in the six-cylinder internal combustion engine. Further, as shown in FIG. 6, when rotation fluctuation amounts consecutively exceed a threshold value, it is determined that two-cylinder-consecutive misfires (for example, consecutive misfires of third cylinder #3 and fourth cylinder #4) have occurred.

It is noted that the rotation speed of the internal combustion engine is detected by a rotation angle sensor (for example a crank position sensor) provided at the crankshaft.

Meanwhile, in an internal combustion engine, rotation fluctuation occurs by a misfire, and in some cases by backlash due to deterioration with age of a flywheel or the like. In some cases, when a vehicle is traveling on a rough road (such as a bumpy road or a gravelly road), torque from the rear wheels of the vehicle is transmitted through the propeller shaft, whereby rotation fluctuation occurs in the flywheel. The rotation fluctuation due to a factor other than a misfire is hardly distinguished from the rotation fluctuation due to a misfire, and therefore a misfire may erroneously be detected.

Accordingly, in order to avoid such erroneous detection of a misfire, there has been proposed a technique of canceling misfire determination based on the presumption that there is backlash due to deterioration with age of a flywheel or the like when the average correlation between a rotation fluctuation value and a misfire determination value is great (for example, see Japanese Patent Laying-Open No. 2004-324524). Further, there has been proposed a technique of prohibiting misfire detection by determining that the vehicle is traveling on a rough road based on rotation fluctuation of the flywheel (for example, see Japanese Patent Laying-Open No. 07-279734).

As a flywheel attached to an internal combustion engine (hereinafter also referred to as an engine), a flywheel damper is known, which absorbs rotation fluctuation of the engine and/or torsional vibration of the rotation shaft to suppress vibration of the powertrain. However, an engine employing a flywheel damper has a problem that the rotation fluctuation becomes irregular when a misfire has occurred and reliability of misfire detection is impaired. The reason thereof is provided in the following.

First, the flywheel damper is a mechanism, for example as shown in FIG. 7, in which an engine-side plate 21 (hereinafter referred to a front plate 21) coupled to the crankshaft of the engine and a mission-side plate 22 (hereinafter referred to as a rear plate 22) coupled to the transmission side are provided, with a spring 23 being arranged between front plate 21 and rear plate 22. In such an engine employing such flywheel damper 2 also, the engine rotation speed is detected by a rotation angle sensor (for example, a crank position sensor) provided at the crankshaft.

In this type of flywheel damper 2, backlash (play: for example 6° (±3°)) is provided between rear plate 22 and spring 23 so that small rotation fluctuation in normal idling operation (with low load/low rotation speed) is absorbed by the backlash. Thus, as indicated by arrow B in FIG. 7, a state in which spring 23 contacts none of front plate 21 and rear plate 22 is maintained. In this state, though slight rotation fluctuation (for example fluctuation in a range of 800-810 rpm) occurs in front plate 21, rear plate 22 rotates substantially constantly (for example, 805 rpm). In flywheel damper 2, when spring 23 does not contact rear plate 22, motive power is transmitted by a frictional mechanism (not shown) or the like.

When a one-cylinder misfire has occurred in the above-described idling operation state, in some cases rear plate 22 moves in the above-described range of backlash, whereby the state in which spring 23 does not contact front plate 21 or rear plate 22 is maintained. Here, erroneous misfire detection may not occur.

On the other hand, when two-cylinder-consecutive misfires have occurred, as shown in FIG. 8, a rotation fluctuation amount due to misfire exceeds a threshold value in the first of the misfiring cylinders (for example the third cylinder) and a misfire is detected, based on the above-described reason.

Then, when a misfire has consecutively occurred in the second of the misfiring cylinders (for example the fourth cylinder), the rotation speed of front plate 21 (engine rotation speed) becomes lower than the rotation speed of rear plate 22 (the rotation speed of the transmission side) (for example, front plate 21 being reduced to 790 rpm thus becoming lower than rear plate 22 being 805 rpm), whereby rear plate 22 contact one end 23a of spring 23.

This contact between rear plate 22 and one end 23a of spring 23 causes energy to be transmitted between rear plate 22 and front plate 21 via spring 23 (the energy of rear plate 22 being provided to front plate 21), whereby the reduction in the rotation speed of front plate 21 due to the misfire becomes small and the rotation fluctuation becomes small. As a result, the rotation fluctuation amount due to the misfire in the second of the misfiring cylinders does not exceed a threshold value. Thus, the misfire in the second of the consecutively misfiring cylinders (for example, the fourth cylinder) cannot be detected. It is noted that, not only the two-consecutive misfires, but also a one-cylinder misfire cannot be detected in some cases, depending on the size of backlash of flywheel damper 2.

When rear plate 22 contacts one end 23a of spring 23, the transmission of energy reduces the rotation speed of rear plate 22. At the time point where the rotation speed of rear plate 22 becomes smaller than the rotation speed of front plate 21, rear plate 22 is disengaged from one end 23a of spring 23, thereby falling within the above described range of backlash. Thereafter, when the rotation speed of front plate 21 becomes higher than that of rear plate 22 by normal combustion of the cylinder, rear plate 22 contacts the other end 23b of spring 23.

The contact between rear plate 22 and the other end 23b of spring 23 causes energy to be transmitted between rear plate 22 and front plate 21 via spring 23 (the energy of front plate 21 being provided to rear plate 22), whereby the rotation speed of front plate 21 is reduced despite the normal combustion. As a result, the rotation fluctuation exceeds a threshold value, and detection is made as if a misfire (for example, a misfire in the sixth cylinder #6) has occurred.

As described above, an engine employing a flywheel damper has the problem that a misfire is erroneously detected in the idling operation range (the low load/low rotation speed range: range A in FIG. 4). In the drive range of intermediate-load (range C in FIG. 4) also, there are the state where rear plate 22 contacts spring 23 and the state where rear plate 22 does not contact spring 23 (the range of arrow C in FIG. 7), and therefore the rotation fluctuation may become irregular when a misfire has occurred, and thus the misfire may erroneously be detected.

Japanese Patent Laying-Open Nos. 2004-324524 and 07-279734 do not consider the problems associated with use of a flywheel damper as described above. Therefore, the techniques disclosed in the publications cannot solve the problems of rotation fluctuation due to a flywheel damper.

DISCLOSURE OF THE INVENTION

The present invention has been made in view of the circumstances, and an object thereof is to provide, in an internal combustion engine employing a flywheel damper, a misfire detection apparatus for the internal combustion engine that can reduce the effect of rotation fluctuation due to the flywheel damper and that can perform reliable misfire detection.

The present invention is directed to a misfire detection apparatus for an internal combustion engine that detects a misfire in the internal combustion engine provided with a flywheel damper based on a rotation fluctuation of the engine.

An operation range where misfire detection is affected by the flywheel damper is set in advance. Whether or not an operation state of the internal combustion engine is within "the operation range affected by the flywheel damper" is determined. When the operation state of the internal combustion engine is within "the operation range affected by the flywheel damper", misfire detection is restricted.

In the present invention, the process of restricting misfire detection may include a cylinder specifying process specifying a misfiring cylinder, and a cylinder number determining process determining the number of misfiring cylinders. Furthermore, a process of stopping (canceling) misfire detection itself may be included in the process of restricting misfire detection.

According to the present invention, since misfire detection is restricted when the operation state of the internal combustion engine is within "the operation range affected by the flywheel damper", erroneous detection attributed to irregular rotation fluctuation behavior of the flywheel damper can be avoided, and the misfire detection performance can be improved.

The present invention may be configured such that, in a case where the cylinder specifying process specifying the misfiring cylinder is performed, when the operation state of the internal combustion engine is outside "the operation range affected by the flywheel damper", a count value of the total misfire counter and a count value of the cylinder-by-cylinder misfire counter are both updated (incremented), and when the operation state of the internal combustion engine is within "the operation range affected by the flywheel damper", only the count value of the total misfire counter is updated (incremented). Employing such a configuration, the count value of the total misfire counter is always updated at the occurrence of a misfire, irrespective of the operation range of the internal combustion engine. Thus, the count value of the total misfire counter (total misfire code) can be obtained as reliable data.

Further, by not updating the count value of the cylinder-by-cylinder misfire counter when the operation state of the internal combustion engine is within "the operation range affected by the flywheel damper", the reliable count value (cylinder-by-cylinder code) can be obtained, that does not contain erroneous detection due to irregular rotation fluctuation behavior of the flywheel damper.

According to the present invention, whether or not an operation state of the internal combustion engine is within "the operation range affected by the flywheel damper" is determined, and when it is, misfire detection is restricted. Thus, erroneous detection due to irregular rotation fluctuation behavior of the flywheel damper can be avoided, and reliable misfire detection can be performed.

BEST MODES FOR CARRYING OUT THE INVENTION

In the following, an embodiment of the present invention is described based on the drawings.

First, an engine (an internal combustion engine) to which a misfire detection apparatus of the present invention is applied is described.

Engine

Figure 1:
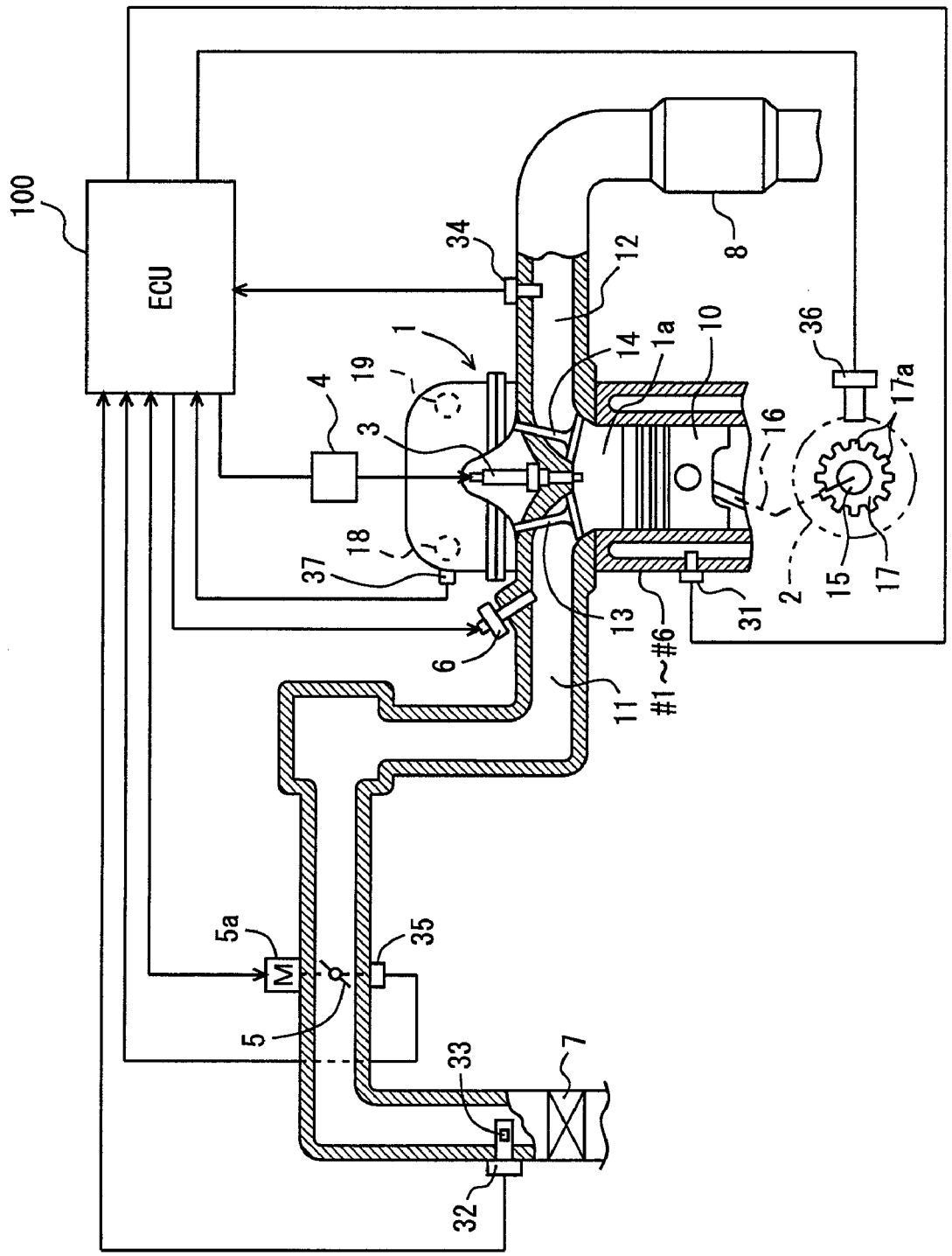
FIG. 1 is a schematic configuration diagram showing one example of an engine to which a misfire detection apparatus of the present invention is applied.

FIG. 1 shows a schematic configuration of an engine to which the present invention is applied. It is noted that FIG. 1 shows the configuration of only one cylinder of the engine.

Figure 7:
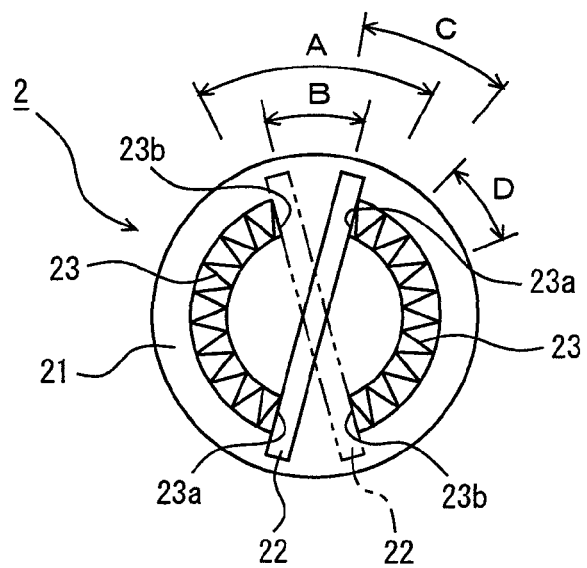
FIG. 7 schematically shows a configuration of a flywheel damper.

Engine 1 is a six-cylinder gasoline engine having six cylinders (first cylinder #1 to sixth cylinder #6), provided with a piston 10 constituting a combustion chamber 1a and a crankshaft 15 being an output shaft. Piston 10 is coupled to crankshaft 15 via a connecting rod 16. The reciprocal motion of piston 10 is converted into rotation of crankshaft 15 by connecting rod 16. Crankshaft 15 of engine 1 is coupled to a transmission (not shown) via a flywheel damper 2 having a structure similarly to that shown in FIG. 7.

To crankshaft 15, a signal rotor 17 having at its outer peripheral surface a plurality of protrusions (teeth) 17a . . . 17a is attached. Near the side of signal rotor 17, a crank position sensor 36 is arranged. Crank position sensor 36 is for example an electromagnetic pickup, and generates a pulse signal (output pulse) corresponding to protrusion 17a of signal rotor 17 when crankshaft 15 rotates.

At combustion chamber 1a of engine 1, a spark plug 3 is arranged. The ignition timing of spark plug 3 is adjusted by an igniter 4. At engine 1, a water temperature sensor 31 detecting the water temperature of the engine (coolant temperature) is arranged.

To combustion chamber 1a of engine 1, an intake manifold 11 and an exhaust manifold 12 are connected. Between intake manifold 11 and combustion chamber 1a, an intake valve 13 is provided, which opens and closes to allow intake manifold 11 and combustion chamber 1a to communicate or to be disconnected relative to each other. Between exhaust manifold 12 and combustion chamber 1a, an exhaust valve 14 is provided, which opens and closes to allow exhaust manifold 12 and combustion chamber 1a to communicate or to be disconnected relative to each other. The opening and closing of intake valve 13 and exhaust valve 14 are effected by rotation of an intake cam shaft 18 and an exhaust cam shaft 19, respectively, to which rotation of crankshaft 15 is transmitted. A cam position sensor 37 for discriminating cylinders is arranged near intake cam shaft 18.

Cam position sensor 37 is for example an electromagnetic pickup. While not shown, cam position sensor 37 is arranged facing one protrusion (tooth) on the rotor outer periphery surface integrally provided at intake cam shaft 18, and outputs a pulse signal when intake cam shaft 18 rotates. As intake can shaft 18 rotates at half the rotation speed of crankshaft 15, cam position sensor 37 generates one pulse signal (output pulse) for each 720° rotation of crankshaft 15.

Arranged at intake manifold 11 are an air cleaner 7, a hot-wire air flow meter 32, an intake air temperature sensor 33 (accommodated in air flow meter 32), and an electronically controlled throttle valve 5 for adjusting an intake air amount of engine 1. Throttle valve 5 is driven by a throttle motor 5a.

The position of throttle valve 5 is detected by throttle position sensor 35. Arranged at exhaust manifold 12 of engine 1 are an $O_2$ sensor 34 detecting the oxygen concentration in the emission gas and a three-way catalyst 8.

At intake manifold 11, an injector 6 for injecting fuel (fuel injection valve) is arranged. Injector 6 is supplied with fuel of a prescribed pressure from a fuel tank by means of a fuel pump (each not shown), and fuel is injected to intake manifold 11. The injected fuel is mixed with the intake air to be air-fuel mixture, which is introduced into combustion chamber 1a of engine 1. The air-fuel mixture (fuel+air) introduced into combustion chamber 1a is ignited by spark plug 3 and combusts/explodes. By the combustion/explosion of the air-fuel mixture in combustion chamber 1a, piston 10 reciprocates and crankshaft 15 rotates. It is noted that combustion/explosion in engine 1 occurs in order of first cylinder #1→second cylinder #2→third cylinder #3→fourth cylinder #4→fifth cylinder #5→sixth cylinder #6.

The above-described operation state of engine 1 is controlled by an ECU (electronic control unit) 100.

ECU

Figure 2:
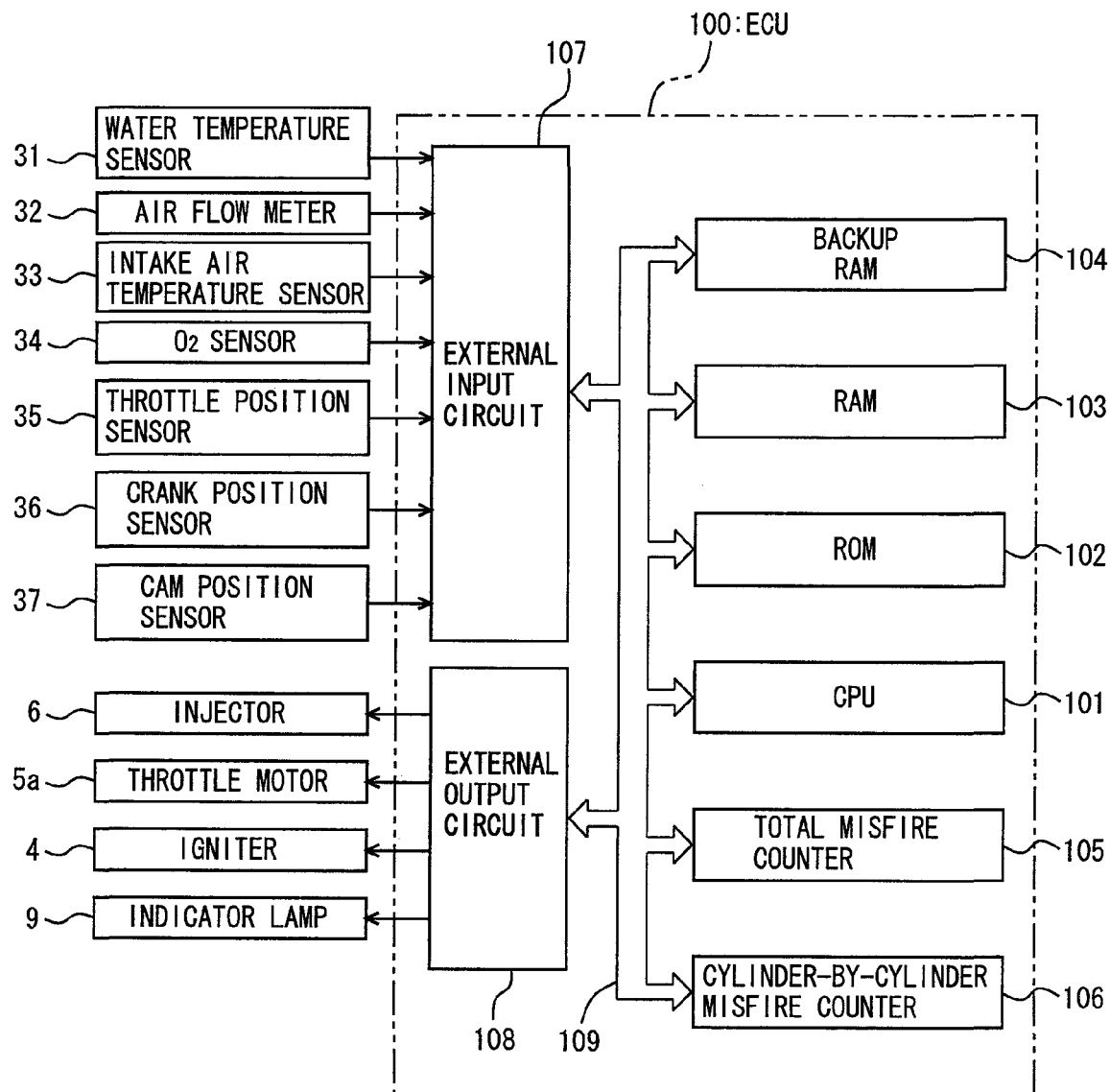
FIG. 2 is a block diagram showing a configuration of a control system such as an ECU.

As shown in FIG. 2, ECU 100 is provided with a CPU 101, an ROM 102, an RAM 103, a backup RAM 104, a total misfire counter 105, a cylinder-by-cylinder misfire counter 106, and the like.

ROM 102 stores various control programs and maps referred to when the various control programs are executed. CPU 101 performs an operation process based on the various control programs and maps stored in ROM 102. RAM 103 is a memory temporarily storing an operation result of CPU 101, data input from each sensor and the like. Backup RAM 104 is a nonvolatile memory storing data of engine 1 to be saved when engine 1 is stopped.

ROM 102, CPU 101, RAM 103, backup RAM 104, total misfire counter 105 and cylinder-by-cylinder misfire counter 106 are connected to each other, and connected to an external input circuit 107 and an external output circuit 108, via a bus 109. Connected to external input circuit 107 are water temperature sensor 31, air flow meter 32, intake air temperature sensor 33, $O_2$ sensor 34, throttle position sensor 35, crank position sensor 36, cam position sensor 37 and the like. Connected to external output circuit 108 are injector 6, igniter 4 of spark plug 3, throttle motor 5a of throttle valve 5, indicator lamp 9 for warning of a misfire trouble.

ECU 100 executes various control over engine 1, based on respective outputs from the various sensors such as water temperature sensor 31, air flow meter 32, intake air temperature sensor 33, $O_2$ sensor 34, throttle position sensor 35, crank position sensor 36, cam position sensor 37, and an accelerator pedal position sensor (not shown). ECU 100 further executes the following misfire detecting process.

Misfire Detecting Process

First, a determination map M used in the misfire detecting process executed by ECU 100 and a misfire detection/cylinder specifying process are described.

Determination Map

Figure 4:
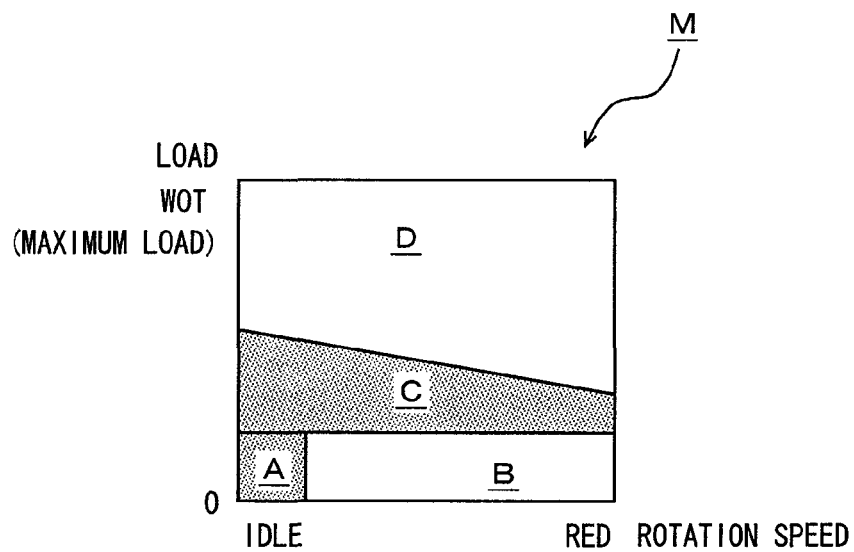
FIG. 4 shows a determination map M used in the misfire detecting process.

In this example, determination map M shown in FIG. 4 is used in the misfire detecting process. Determination map M is prepared employing the rotation speed and load of engine 1 as parameters, and set in advance in ROM 102 of ECU 100.

Determination map M is a map used in determining whether or not to execute a cylinder specifying process for specifying a misfiring cylinder. In the map, a range A, a range B, a range C and a range D are set. Among the four ranges, range A (idling operation range) and range C (operation range of an intermediate load) are the ranges where a cylinder specifying process is stopped. Range A, range B, range C and range D of determination map M respectively correspond to ranges indicated by arrows "A", "B", "C", and "D" of flywheel damper 2 in FIG. 7.

It is noted that, in determination map M of FIG. 4, range A and range C (operation ranges affected by the flywheel damper) where a cylinder specifying process is stopped should be determined considering the behavior of rotation fluctuation (an effect to misfire detection) occurring due to the above-described backlash (a play amount) of flywheel damper 2. Specifically, for example, varying the engine rotation speed and load of an actual machine of engine 1, the rotation fluctuation when a misfire has occurred under various operation conditions ranging from a low rotation speed/low load range to a high rotation speed range (red zone)/high load (WOT: Wide Open Throttle) may be measured. Based on the measurement result, ranges where a misfiring cylinder is hardly specified may be obtained, whereby the ranges A and C may be set. Alternatively, by means of a computer or the like, the rotation fluctuation when a misfire has occurred under various operation conditions ranging from low rotation speed/low load range to high rotation speed range/high load may be simulated. Based on the simulation result, ranges where a misfiring cylinder is hardly specified may be obtained, whereby the ranges A and C may be set.

Misfire Detection/Cylinder Specifying Process

First, based on outputs of crank position sensor 36 and cam position sensor 37 and the like, ECU 100 sequentially performs operations to obtain an elapsed time T1 (first cylinder #1), an elapsed time T2 (second cylinder #2), an elapsed time T3 (third cylinder #3), an elapsed time T4 (fourth cylinder #4), an elapsed time T5 (fifth cylinder #5), and an elapsed time T6 (sixth cylinder #6) which are the time periods required for crankshaft 15 to rotate by a certain crank angle (for example, CA=120°) in the explosion strokes of cylinders #1-#6 of engine 1, respectively, and sequentially performs operations to obtain deviation of the elapsed times, that is, rotation fluctuation amounts ΔNE1-ΔNE6 of respective cylinders #1-#6, wherein:

ΔNE1 (first cylinder #1)=[T1-T6], ΔNE2 (second cylinder #2)=[T2-T1], ΔNE3 (third cylinder #3)=[T3-T2], ΔNE4 (fourth cylinder #4)=[T4-T3], ΔNE5 (fifth cylinder #5)=[T5-T4], and ΔNE6 (sixth cylinder #6)=[T6-T5].

Figure 5:
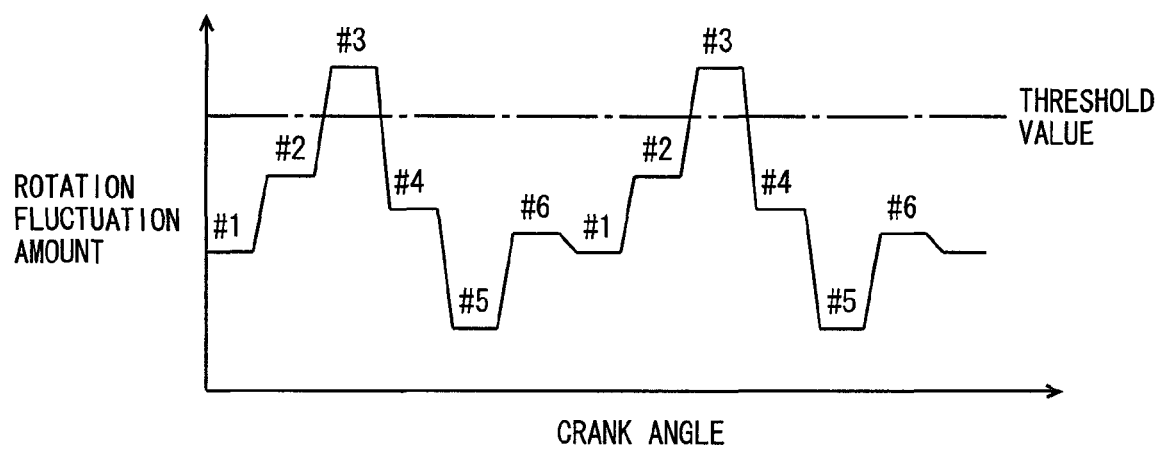
FIG. 5 shows one example of a variation pattern of a rotation fluctuation amount when a misfire has occurred.
Figure 6:
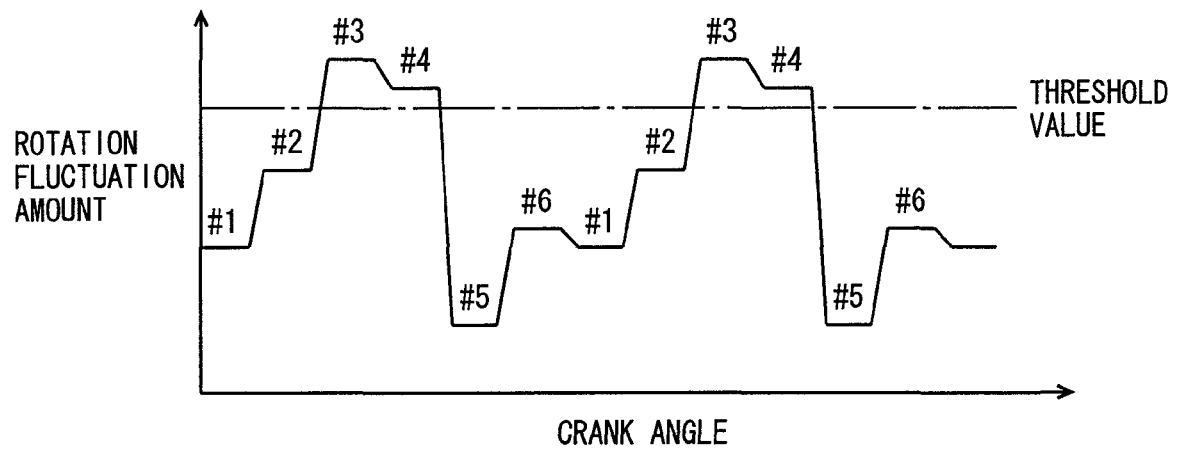
FIG. 6 shows another example of a variation pattern of the rotation fluctuation amount when a misfire has occurred.

When one of or a plurality of rotation fluctuation amounts ΔNE1-ΔNE6 of respective cylinders #1-#6 obtained according to the above operation exceed(s) a prescribed threshold value (see FIGS. 5 and 6), ECU 100 determines that a misfire has occurred.

When ECU 100 determines that a misfire has occurred, it executes a cylinder specifying process for specifying a misfiring cylinder, based on the outputs of crank position sensor 36 and cam position sensor 37, the operation results of rotation fluctuation amounts ΔNE1-ΔNE6 and the like. On the other hand, if the operation state of engine 1 is within range A or C of determination map M of FIG. 4, it does not perform the cylinder specifying process.

Figure 3:
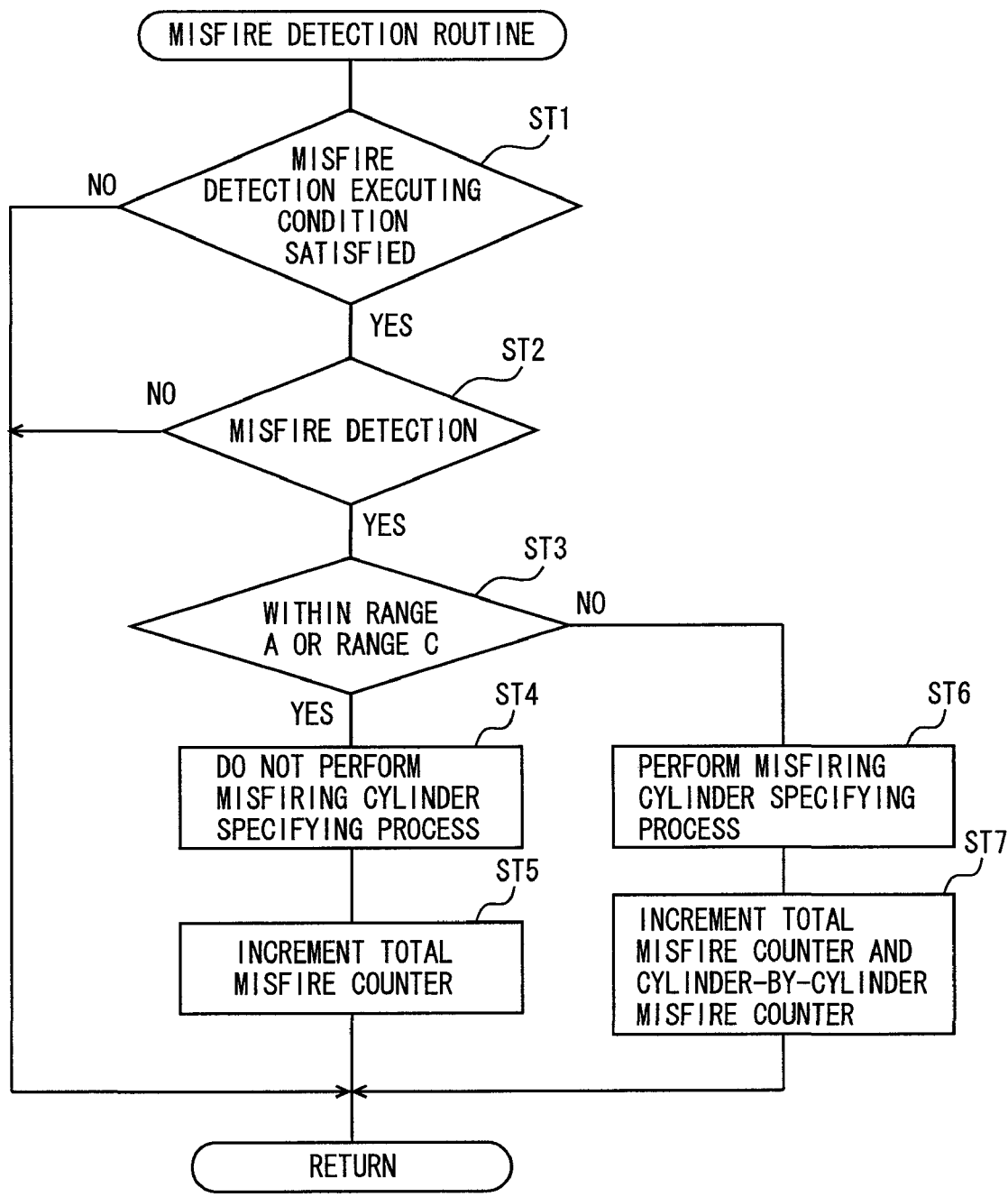
FIG. 3 is a flowchart showing a process content of a misfire detecting process executed by the ECU.

The above-described "misfiring detection" and "cylinder specifying process" are the processes executed in steps ST2 and ST6 in the misfire detection routine of FIG. 3.

Misfire Detection Routine

Next, the process content of the misfire detecting process executed by ECU 100 is described, referring to the flowchart of FIG. 3. The misfire detection routine is executed repeatedly by certain time cycles.

First, in step ST1, ECU 100 determines whether or not a prescribed misfire detection executing condition is satisfied. When the determination result is negative, it once ends the misfire detection routine. On the other hand, if the determination result in step ST1 is positive, that is, when the misfire detection executing condition is satisfied, the control goes to step ST2.

Here, the "misfire detection executing condition" refers to a statutory condition. For example, a positive torque range is attained in a state where fuel cut is not performed, the operation state of engine 1 is in [(idling rotation −150 rpm) to (red rotation speed)].

In step ST2, ECU 100 determines whether a misfire has occurred in cylinders #1-#6 of engine 1 by the scheme as described above, and if the determination result is negative, that is, when a misfire has not occurred, it once ends the misfire detection routine. On the other hand, when the determination result in step ST2 is positive, that is, a misfire has occurred in one of cylinders #1-#6 of engine 1, the control goes to step ST3.

In step ST3, ECU 100 determines whether the current operation state of engine (rotation speed/load) of engine 1 is within range A or range C of determination map M of FIG. 4. When the determination result is positive, that is, when the operation state of engine 1 where a misfire has occurred is within "the range affected by the flywheel damper", it does not execute the process of specifying the misfiring cylinder (step ST4). After incrementing only total misfire counter 105 in step ST5, it once ends the misfire detection routine.

On the other had, if the determination result in step ST3 is negative, that is, when the operation state of engine 1 where a misfire has occurred is within range B or range D (that is, the operation state of engine 1 is outside "the range affected by the flywheel damper"), the control goes to step ST6.

In step ST6, ECU 100 specifies the misfiring cylinder by the cylinder specifying process described above. After incrementing total misfire counter 105 and cylinder-by-cylinder misfire counter 106 in step ST7, it once ends the misfire detection routine.

It is noted that, in this example, warning of misfire trouble, that is, turning on indicator lamp 9, is performed based on the determination using the count value of total misfire counter 105. That is, at the time point where the count value of total misfire counter 105 reaches a prescribed value (for example, 30-60 counts), indicator lamp 9 is turned on.

Figure 8:
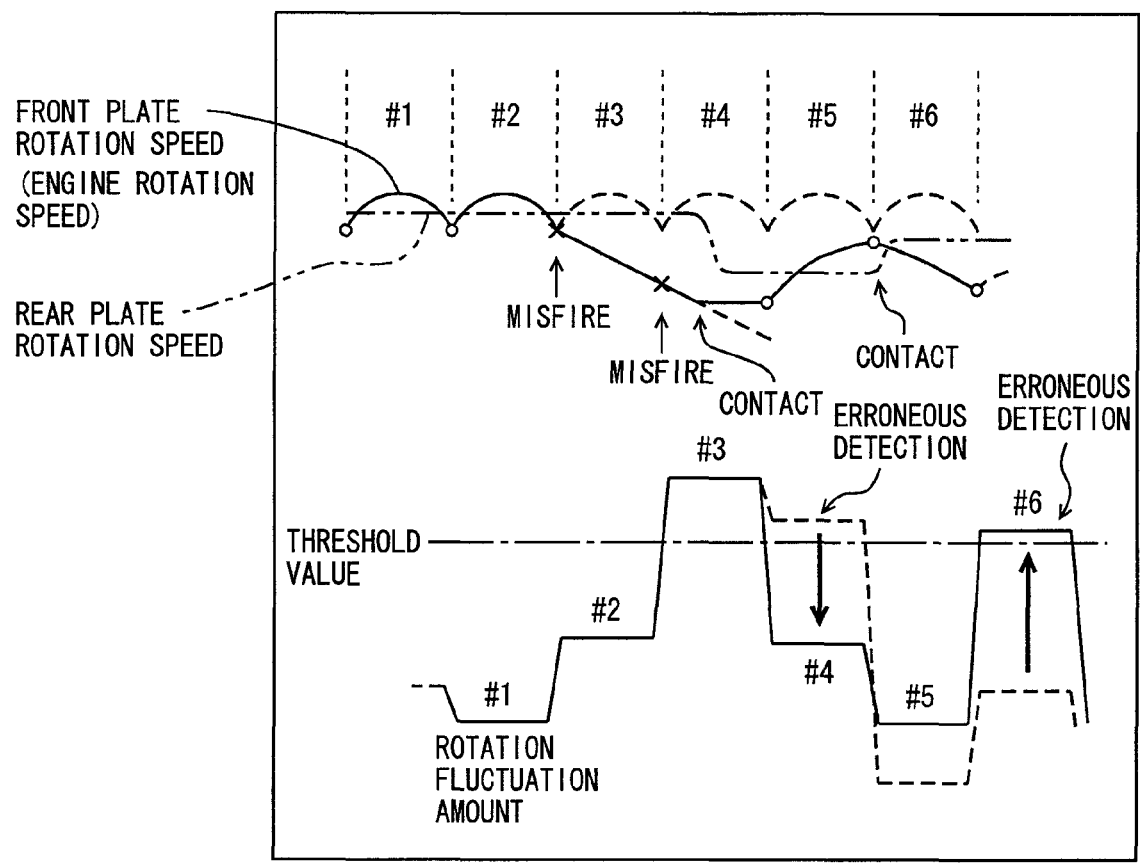
FIG. 8 is an explanatory view of a problem (misfire erroneous detection) associated with an engine employing a flywheel damper.

According to the misfire detecting process described above, when the operation state of engine 1 is within "the range affected by the flywheel damper (range A or range C)", the cylinder specifying process for specifying the misfiring cylinder is stopped. Therefore, for example if there is erroneous detection such as shown in FIG. 8, that is, "erroneous detection in which, when there is two-cylinder-consecutive misfires (of third cylinder # and fourth cylinder #4, for example), the misfire of the second (for example, fourth cylinder #4) of the misfiring cylinders is not detected", and "erroneous detection as if a misfire (for example, a misfire of sixth cylinder #6) has occurred, despite such a misfire has not occurred" can be avoided. Thus, reliability in misfire detection can be improved. Moreover, the misfire detection itself is performed irrespective of whether the operation state of engine 1 is within "the range affected by the flywheel damper", and therefore the misfire detection function can be ensured.

Here, there are statutory misfire codes of "unknown-cylinder misfiring code (total misfire code)" and "cylinder specifying code". In a garage or the like, these two types of codes are used for detailed examination. In the misfire detecting process of this example, the count value of total misfire counter 105 is always incremented when a misfire has occurred, irrespective of the operation range of engine 1. Thus, the count value of total misfire counter 105, that is, the total misfire code, is obtained as highly reliable data, enabling the detailed examination in a garage or the like.

It is noted that, in the misfire detecting process of the present example, when the operation state of engine 1 is within "the range affected by the flywheel damper", the count value of cylinder-by-cylinder misfire counter 106 is not incremented. Accordingly, the count value of cylinder-by-cylinder misfire counter 106, that is, the cylinder specifying code, is advantageous in performing a detailed examination as compared to the case where the cylinder specifying code including erroneous detection affected by flywheel damper 2 is obtained, though it may not exactly reflects the actual misfire state.

OTHER EMBODIMENT

In the embodiment described above, in addition to the cylinder specifying process, a cylinder number determining process may be performed, for determining whether a misfire is a one-cylinder misfire (see FIG. 5), two-cylinder consecutive misfires (see FIG. 6), or intermittent two-cylinder misfires (one normal combustion between two misfires). In this case, when the operation state of engine 1 is within "the range affected by the flywheel damper", both of the cylinder specifying process and the cylinder number determining process are stopped. It is noted that only the cylinder number determining process may be performed in place of the cylinder specifying process. In this case also, when the operation state of engine 1 is within "the range affected by the flywheel damper", the cylinder number determining process may be stopped.

In the embodiment described above, the cylinder specifying process is stopped when the operation state of engine 1 is within "the range affected by the flywheel damper". However, the present invention is not limited thereto, and the misfire detection itself may be stopped when the operation state of engine 1 is within "the range affected by the flywheel damper".

In the embodiment described above, the example where the present invention is applied to a six-cylinder gasoline engine has been shown. However, the present invention is not limited thereto, and it is applicable to other multicylinder gasoline engine having any number of cylinders, such as a four-cylinder gasoline engine. The present invention is applicable to various types of multicylinder engines such as an in-line or V-type multicylinder engine, or a longitudinal or transverse multicylinder engine. Further, not being limited to a gasoline engine, the present invention is applicable to an engine of an ignition type employing other fuel such as LPG (liquefied petroleum gas) or LNG (liquefied natural gas).

It should be understood that the embodiments disclosed herein are illustrative and non-restrictive in every respect. The scope of the present invention is defined by the terms of the claims, rather than the description above, and is intended to include any changes within the scope and meaning equivalent to the terms of the claims.

The invention claimed is:

1. A misfire detection apparatus for an internal combustion engine that detects a misfire in the internal combustion engine provided with a flywheel damper based on a rotation fluctuation of the engine, wherein an operation range where misfire detection is affected by said flywheel damper is set in advance, the misfire detection apparatus for the internal combustion engine comprises:

a determination portion determining whether or not an operation state of said internal combustion engine is within the operation range affected by said flywheel damper;

a detection control portion restricting misfire detection, when the operation state of said internal combustion engine is within the operation range affected by said flywheel damper; and a total misfire counter and a cylinder-by-cylinder misfire counter, wherein a count value of said total misfire counter and a count value of said cylinder-by-cylinder misfire counter are both updated, when the operation state of said internal combustion engine is outside the operation range affected by said flywheel damper, and only the count value of said total misfire counter is updated, when the operation state of said internal combustion engine is within the operation range affected by said flywheel damper.

2. The misfire detection apparatus for the internal combustion engine according to claim 1, wherein a cylinder specifying process specifying a misfiring cylinder is not performed, when the operation state of said internal combustion engine is within the operation range affected by said flywheel damper.

3. The misfire detection apparatus for the internal combustion engine according to claim 1, wherein a cylinder number determining process determining a number of misfiring cylinders is not performed, when the operation state of said internal combustion engine is within the operation range affected by said flywheel damper.

4. The misfire detection apparatus for the internal combustion engine according to claim 2, wherein a cylinder number determining process determining a number of misfiring cylinders is not performed, when the operation state of said internal combustion engine is within the operation range affected by said flywheel damper.

5. A misfire detection apparatus for an internal combustion engine that detects a misfire in the internal combustion engine provided with a flywheel damper based on a rotation fluctuation of the engine, wherein an operation range where misfire detection is affected by said flywheel damper is set in advance, the misfire detection apparatus for the internal combustion engine comprises:

determination means for determining whether or not an operation state of said internal combustion engine is within the operation range affected by said flywheel damper;

detection control means for restricting misfire detection, when the operation state of said internal combustion engine is within the operation range affected by said flywheel damper; and a total misfire counter and a cylinder-by-cylinder misfire counter, wherein a count value of said total misfire counter and a count value of said cylinder-by-cylinder misfire counter are both updated, when the operation state of said internal combustion engine is outside the operation range affected by said flywheel damper, and only the count value of said total misfire counter is updated, when the operation state of said internal combustion engine is within the operation range affected by said flywheel damper.

6. The misfire detection apparatus for the internal combustion engine according to claim 5, wherein
  a cylinder specifying process specifying a misfiring cylinder is not performed, when the operation state of said internal combustion engine is within the operation range affected by said flywheel damper.

7. The misfire detection apparatus for the internal combustion engine according to claim 5, wherein
  a cylinder number determining process determining a number of misfiring cylinders is not performed, when the operation state of said internal combustion engine is within the operation range affected by said flywheel damper.

8. The misfire detection apparatus for the internal combustion engine according to claim 6, wherein
  a cylinder number determining process determining a number of misfiring cylinders is not performed, when the operation state of said internal combustion engine is within the operation range affected by said flywheel damper.

9. A misfire detection apparatus for an internal combustion engine that detects a misfire in the internal combustion engine provided with a flywheel damper based on a rotation fluctuation of the engine, wherein an operation range where misfire detection is affected by said flywheel damper is set in advance, the misfire detection apparatus for the internal combustion engine comprises an electronic control unit (ECU), a total misfire counter, and a cylinder-by-cylinder misfire counter, wherein said electronic control unit (ECU) determines whether or not an operation state of said internal combustion engine is within the operation range affected by said flywheel damper, said electronic control unit (ECU) updates both a count value of said total misfire counter and a count value of said cylinder-by-cylinder misfire counter, when the operation state of said internal combustion engine is outside the operation range affected by said flywheel damper, and said electronic control unit (ECU) restricts misfire detection and updates only the count value of said total misfire counter, when the operation state of said internal combustion engine is within the operation range affected by said flywheel damper.

* * * * *